United States Patent [19]
Rosback

[11] 3,894,109
[45] July 8, 1975

[54] AROMATIC HYDROCARBON ISOMER SEPARATION BY ADSORPTION

[75] Inventor: Donald H. Rosback, Elmhurst, Ill.

[73] Assignee: Universal Oil Products Company, Des Plaines, Ill.

[22] Filed: Feb. 15, 1974

[21] Appl. No.: 443,043

Related U.S. Application Data

[63] Continuation-in-part of Ser. No. 356,666, July 23, 1973.

[52] U.S. Cl. ......... 260/674 SA; 208/310; 252/455 Z
[51] Int. Cl. ............................................... C07c 7/12
[58] Field of Search ............. 260/674 SA; 208/310; 252/455 Z; 423/112

[56] References Cited
UNITED STATES PATENTS

| | | | |
|---|---|---|---|
| 3,382,039 | 5/1968 | Calmon et al. | 252/455 |
| 3,549,558 | 12/1970 | Berry et al. | 252/455 |
| 3,558,730 | 1/1971 | Neuzil | 260/674 |
| 3,663,638 | 5/1972 | Neuzil | 260/674 |
| 3,734,974 | 5/1973 | Neuzil | 260/674 |

*Primary Examiner*—Delbert E. Gantz
*Assistant Examiner*—C. E. Spresser
*Attorney, Agent, or Firm*—James R. Hoatson, Jr.; Thomas K. McBride; William H. Page, II

[57] ABSTRACT

The para-isomer from a hydrocarbon feed mixture comprising at least two bi-alkyl substituted aromatic isomers, including the para-isomer, said isomers having from 8 to about 18 carbon atoms per molecule, is separated with a specially prepared solid aluminosilicate adsorbent containing barium and potassium cations or barium cations at the exchangeable sites. The key feature of the adsorbent used in this process is the absence of hydrogen cations or Group II-A cations other than barium at the exchangeable sites thereby permitting faster adsorption-desorption rates for the desired para isomer.

16 Claims, No Drawings

AROMATIC HYDROCARBON ISOMER SEPARATION BY ADSORPTION

CROSS-REFERENCE TO RELATED APPLICATIONS

This application is a continuation-in-part of my prior, copending application Ser. No. 356,666 which was filed on July 23, 1973 all of the teachings of which are incorporated herein by reference.

BACKGROUND OF THE INVENTION

1. Field of the Invention

The subject of the present invention is an improved adsorbent having superior properties when used in a process to separate para isomers from a feed mixture comprising at least two bi-alkyl substituted monocyclic aromatic isomers, including the para-isomer, the isomer having from 8 to about 18 carbon atoms per molecule.

2. Description of the Prior Art

I have discovered that ion-exchanging particles of a base material comprising type X or type Y zeolite and amorphous material as a binder with an aqueous solution of sodium hydroxide prior to the ion exchange with potassium and barium or barium alone produces an adsorbent possessing faster adsorption-desorption rates when used to separate the para-isomer from a feed mixture comprising at least two bi-alkyl substituted monocyclic aromatic isomers, including the para isomer, the isomers having from 8 to about 18 carbon atoms per molecule. The reason for this is not entirely understood but it is hypothesized that the ion-exchange with aqueous sodium hydroxide replaces non-sodium cations, such as H+ or Group II-A cations, occupying exchangeable sites within the zeolite thereby permitting higher amounts of barium and potassium or barium alone to be added during a subsequent ion-exchange step.

As related art, the U.S. Pat. Nos. 3,558,730; 3,558,732; 3,626,020; and 3,663,638 of my assignee show that adsorbents comprising crystalline aluminosilicates and containing barium and potassium are useful for separating a specific para-isomer, namely para-xylene from a mixture of $C_8$ aromatic hydrocarbons.

Furthermore, the treating of crystalline aluminosilicates with a caustic solution to achieve other results has been recognized in the prior art. U.S. Pat. No. 3,326,797, for example, discloses a process for aqueous caustic treating of high silica zeolites having silica over alumina ratios between about 6 and 12, at treating conditions, for the sole purpose of removing a certain percentage of structural silica from the zeolite. The caustic treatment, at conditions to preferably retain a final $SiO_2/Al_2O_3$ ratio greater than about 5.5, is found to increase the adsorptive capacity of the zeolite and to increase its catalytic activity. The caustic treating process of that reference patent is concerned only with etching or leaching of silica from the zeolite structure to achieve these characteristics and neither discloses nor suggests the addition of alkali metal cations to the zeolite structure during the treatment process for any reason whatever.

The present invention comprehends the improved process for separating the para isomer from a feed mixture comprising at least two bi-alkyl substituted monocyclic aromatic isomers, including the para isomer, the isomers having from 8 to about 18 carbon atoms per molecule, which processes are produced by the use of this specially prepared adsorbent. Specifically the present invention comprehends an improved adsorption process for the separation of para-xylene from a feed mixture comprising para-xylene and at least one other $C_8$ aromatic isomer.

SUMMARY OF THE INVENTION

It is, accordingly, a broad object of my invention to provide a process which employs a specially prepared adsorbent to effect the separation of para isomer from a feed mixture comprising at least two bi-alkyl substituted aromatic isomers, including the para isomer, the isomers having from 8 to about 18 carbon atoms per molecule. More specifically, it is an objective of my invention to provide a process which employs a specially prepared adsorbent to effect the separation of para-xylene from a feed mixture comprising para-xylene and at least one other $C_8$ aromatic isomer.

In brief summary, my invention is, in its broadest embodiment a process for separating the para isomer from a feed mixture comprising at least two bi-alkyl substituted monocyclic aromatic isomers, including the para isomer, said isomers having from 8 to about 18 carbon atoms per molecule which process comprises contacting said mixture with an adsorbent prepared by the steps of: (a) contacting a base material comprising type X or type Y zeolite with an aqueous sodium hydroxide solution at first ion exchange conditions to effect the addition of sodium cations to said base material; (b) treating the sodium-exchanged base material at second ion exchange conditions to effect the essentially complete exchange of sodium cations; and, (c) drying the material at conditions to reduce the LOI at 900° C. to less than about 10 wt. % and thereby selectively adsorbing at adsorption conditions said para isomer.

DESCRIPTION OF THE INVENTION

The type X and type Y crystalline aluminosilicates or zeolites herein contemplated are described as a three-dimensional network of fundamental structural units consisting of siliconcentered $SiO_4$ and aluminum-centered $AlO_4$ tetrahedra interconnected by a mutual sharing of apical oxygen atoms. The space between the tetrahedra is occupied by water molecules and subsequent dehydration or partial dehydration results in a crystal structure interlaced with channels of molecular dimension.

The type X structured and type Y structured zeolite as used in this specification shall include crystalline aluminosilicates having such three dimensional interconnected structures and as specifically defined by U.S. Pat. Nos. 2,882,244 and 3,130,007. The terms "type X structured" and "type Y structured" zeolites shall include all zeolites which have a general structure as represented in the above cited patents.

The type X structured zeolite in the hydrated or partially hydrated form has the general empirical formula as shown in Formula 1 below:

Formula 1

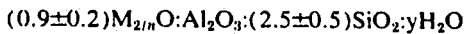

where M represents at least one cation having a valence of not more than 3, $n$ represents the valence of M and $y$ is a value up to about 8 depending upon the identity of M and the degree of hydration of the crystal. The cation "M" may be one or more of a number of cations such as the hydrogen cation, the alkali metal cation, or the alkaline earth cations or other selected cations and is generally referred to as an exchangeable site.

The type Y structured zeolite in the hydrated or partially hydrated form can be represented in terms of the mole oxides for the sodium form as represented by the Formula 2 below:

Formula 2

$$(0.9\pm0.2)Na_2O:Al_2O_3:wSiO_2:yH_2O$$

where $w$ is a value of greater than about 3 up to about 8, and $y$ may be any value up to about 9.

The term "type X zeolite" and "type Y zeolite" as employed herein shall refer not only to type X structured and type Y structured zeolites containing sodium cations as indicated in Formula 1 and Formula 2 above but also shall refer to those containing other additional cations such as hydrogen cations, the alkali metal cations or the alkaline earth cations. Typically both the type X and type Y structured zeolites as initially prepared and as used as a base material for the special adsorbent described herein are predominantly in the sodium form but they usually contain any or all of the cations mentioned above as impurities.

The term "base material" as used herein shall refer to a type X or type Y zeolite-containing starting material used to make the special adsorbent described below. Generally the base material will be in the form of particles such as extrudates, aggregates, tablets, pills, macro-spheres, or granules produced by grinding any of the above to a desired size range. The type X or type Y zeolite can be present in the base material in concentrations generally ranging from about 75 wt. % to about 98 wt. % of the base material based on a volatile free composition. The remaining material in the base material generally comprises amorphous silica or alumina or both which is present in intimate mixture with the zeolite material. This amorphous material may be an adjunct of the manufacturing process of the type X or type Y zeolite (for example, intentionally incomplete purification of the zeolite during its manufacture) or it may be added to the relatively pure zeolite to aid in forming particles of the zeolite.

A specific base material is commercially available nominal 1/16-inch extrudate comprising 13X zeolite and a minor amount of amorphous material as binder. This base material is primarily in the sodium form; that is, the cation represented as M in Formula 2 above is primarily sodium. By chemical analysis the $Na_2O/Al_2O_3$ ratio is usually about 0.7 or less and can typically be about 0.6 or less which, it should be noted, is less than the $0.9\pm0.2$ indicated in Formula 1 above. Other cations such as H+ and any of the Group II-A metal cations may be present, primarily as impurities, to supply the remainder of the cations needed for chemical balance. The silica to alumina ratio of this starting material by X-ray determination is about 2.5 and the same ratio by chemical analysis is about 2.6. Normally the starting material whether in the extrudate or pellet form is granulated to a particle size range of about 20–40 mesh (Standard U.S. Mesh) before the first ion exchange step is begun. This is approximately the desired particle size of the finished adsorbent.

The first ion exchange with an aqueous sodium hydroxide solution replaces non-sodium cation impurities in the type X or type Y zeolite contained in the base material thereby converting the zeolite essentially completely to the sodium form. Increasing the sodium content of the zeolite permits a higher loading of barium and potassium cations or of the barium cations alone into the zeolite structure on a subsequent ion exchange. To produce an acceptable adsorbent it is preferred that the sodium content of the starting material, as characterized by the weight ratio $Na_2O/Al_2O_3$ be increased to a ratio greater than about 0.70 and more preferably from about 0.75 to 1.0. Ion exchange conditions should be so regulated to achieve this degree of ion exchange.

Although mild ion exchange conditions are employed, this step additionally removes a small amount of silica and alumina. Total silica and alumina removal from the base material is from about 1 to about 15% and is generally in the range of about 1 to 5 wt. %. Analyses indicate that the bulk of both soluble and insoluble material removed from the base material is aluminum, as alumina or sodium aluminate. At least a portion of the alumina extracted appears to be from the zeolite itself rather than from any amorphous material since there is some nominal loss of zeolite as detected by X-ray analysis after this step. It is not known whether the small amount of silica removed from the base material came from the crystalline (zeolite) portion or the amorphous portion of the base material.

The degree of ion exchange and extraction of alumina achieved is a function of the three variables of caustic concentration, temperature at which the ion exchange is conducted, and the length of time the ion exchange is continued.

The sodium hydroxide used to prepare the aqueous sodium hydroxide solution should be of high purity having very low levels of both other Group I-A impurities and Group II-A impurities. Suitable concentrations to obtain the desired ion exchange can be from about 0.5 to 10 wt. % of the sodium hydroxide with the preferred concentration being from about 0.5 to 5 wt. %. By using solutions containing sodium hydroxide within these ranges of concentration, the desired ion exchange can be obtained at temperatures from about 50° to 250° F. with temperatures from about 150° to 250° F. being especially preferred. Operating pressure is not critical and need only be sufficient to insure a liquid phase. Operating pressures can range from about atmospheric pressure to about 100 psig. The length of time required for the ion exchange will vary, depending upon the solution concentration and temperature, from about 0.5 to 5 hours. Within the above preferred concentrations and temperature ranges, a contact time which has been shown to be especially preferred is about 2 to 3 hours. Continuous or batch-type operations can be employed. The ion exchange step should be controlled so that the zeolite structure will not be destroyed and so that the final product will have a $Na_2O/Al_2O_3$ ratio greater than about 0.7 and more preferably from about 0.75 to 1.0.

After the first ion exchange step the sodium exchanged particles are treated at second ion-exchange conditions to effect essentially complete exchange of the sodium cations with both barium and potassium cations in a weight ratio of from about 1.5 to 200 or with barium cations alone.

Second ion exchange conditions will include a temperature of from about 50° to about 250° F. and pH sufficient to preclude the formation of the hydrogen form of the zeolite. The pH will therefore be greater than 7 and preferably within the range of 7 to 10. Operation pressure is not critical and need only be sufficient to insure a liquid phase. Operating pressures can range from about atmospheric pressure to about 150 psig. The length of time for the essentially complete exchange of the sodium cations will be from about 0.5 to about 5 hours depending upon the concentration of the cation in the ion exchange medium and the temperature. The term "essentially complete exchange" as used herein shall mean that the sodium cation content has been reduced to about 2.0 wt. % or less and more preferably to about 1 wt. % or less.

The preferred method of ion-exchange when the adsorbent contains both barium and potassium cations is a two-step procedure wherein the sodium-exchanged particles are initially treated in contact with an aqueous solution of a potassium salt, preferably an aqueous solution of potassium chloride, for a time sufficient to reduce the sodium cations to less than about 2 wt. % of the zeolite and yield the potassium form of the zeolite. The exchange can be either a continuous or a batch type operation. The ion-exchange is suitable accomplished on passing a 7 wt. % aqueous potassium chloride solution through a bed of sodium-exchanged particles at about 180° F. at a liquid hourly space velocity of about one until a total of approximately 13 pounds of solution per pound of said particles has been passed in contact therewith.

The potassium-exchanged particles can then be washed with water to remove excess ion exchange solution.

The washing medium will be water which has a pH adjusted to and maintained within the range of 7 to 10 by adding small amounts of potassium hydroxide. Since the primary purpose of the sodium cation ion exchange was to remove hydrogen cation (and metal cation) contaminants, this pH range is necessary to avoid redepositing hydrogen cation on the adsorbent mass. Washing temperatures can include temperatures within the range of about 100° to about 200° F. with a temperature of about 100° to 145° F. preferred. Although the washing step can be done in a batch manner with one aliquot of wash water at a time, the washing step is generally and preferably done on a continuous flow type basis with water passed through a bed of the adsorbent at a given liquid hourly space velocity and a temperature for period of time in order that from about 1 to about 5 gallons of water per pound of starting material used to wash the material. Preferred washing conditions include using liquid hourly space velocities from about 0.5 to 5, with 1.5 being preferred, to pass from about 1 to about 3 gallons of wash water per pound of starting material over the ion exchanged adsorbent.

The potassium-exchanged particles are then treated in contact with an aqueous solution of a barium salt in the second step of the two-step ion-exchange procedure to achieve the desired weight ratio of barium to potassium on the finished adsorbent. Preferably an aqueous solution of from about 0.2 to about 5 wt. % barium chloride is recycled through the particle bed at about 180° F. and at a liquid hourly space velocity of from about 1 to about 5 until the desired degree of exchange has been achieved. After the barium-exchange step is completed, the water-washing step is repeated, again maintaining a pH of 7 or greater in order to prevent or minimize the possibility of formation of the hydrogen form of the zeolite. A good indication of complete washing can be made by quantitatively testing the effluent wash water for the presence of the anion portion of the salt used in the ion exchange solution.

The above-mentioned two-step potassium and barium ionexchange procedure is not necessarily limiting as it has been found possibly to employ a single step ion-exchange in which both barium and potassium are placed on the zeolite. However, the two-step procedure allows more precise control of the amount of cations placed on the zeolite.

When it is desired that the sodium cations be essentially completely exchanged with only barium cations then a procedure like that of the second step of the above described two-step procedure will be used alone to effect the exchange with barium cations. I have found that by the method of this invention a suitable adsorbent can be prepared without the potassium cations.

When the wash step is completed the wet adsorbent particles will usually contain from about 30 to about 50 wt. % volatile matter (water) as measured by loss on ignition to 900° C. In this specification, the volatile matter content of the zeolite adsorbent is determined by the weight difference obtained before and after drying a sample of adsorbent in a high temperature furnace at 900° C. under an inert purge gas stream such as nitrogen for a period of time sufficient to achieve a constant weight. The difference in weight, calculated as a percentage of the sample's initial weight, is reported as loss on ignition (LOI) at 900° C. and represents the volatile matter present within the adsorbent. The remaining step in the method of manufacture then is the drying step to reduce the LOI at 900° C. to less than about 10 wt. % with the preferred LOI being about 3 7 wt. %. After the washing has been completed, the particles can be unloaded and dried in a forced air oven at temperatures above the boiling point of water but less than about 500°C. and preferably about 150° C., for a period of time sufficient to remove enough water so that the volatile matter content of the zeolite is below about 10 wt. %. Other methods of drying may be used which can include drying in the presence of an inert gas or under a vacuum, or both.

One can appreciate that certain characteristics of adsorbents are highly desirable, if not absolutely necessary, to the successful operation of the selective adsorptive process. Among such characteristics are: adsorptive capacity for some volume of the para isomer per volume of adsorbent; adsorption for the para isomer with respect to the other aromatic isomers and the desorbent; and sufficiently first rates of adsorption and desorption of the para isomer to and from the adsorbent.

Capacity of the adsorbent for adsorbing a specific volume of para isomer is of course a necessity; without such capacity the adsorbent is useless for adsorptive separation. Furthermore, the higher the adsorbent's capacity for the species to be adsorbed, the better is the adsorbent. A reduction in the amount of adsorbent required for a specific adsorptive separation reduces the cost of the separation process. It is, of course, important that the good initial capacity of the adsorbent to be maintained during actual use in the separation process over some economically desirable life.

The other important adsorbent characteristic is the ability of the adsorbent to separate components of the feed; or, in other words, the selectivity, (B), of the adsorbent for one component as compared to another component. Selectivity can be expressed not only for the desired aromatic isomer (para isomer) as compared to undesired isomers but can also be expressed between any feed stream isomer and the desorbent. The selectivity (B) as used throughout this specification is defined as the ratio of the two components of the adsorbed phase over the ratio of the same two components in the unadsorbed phase at equilibrium conditions.

Selectivity is shown as Equation 1 below:

Equation 1

$$\text{Selectivity} = (B) = \frac{[\text{vol. percent } C/\text{vol. percent } D]_A}{[\text{vol. percent } C/\text{vol. percent } D]_U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectively of two components approaches 1.0 there is no preferential adsorption of one component by the adsorbent. As the (B) becomes less than or greater than 1.0 there is a preferential selectivity by the adsorbent of one component. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The third important characteristic is the rate of exchange of the adsorbed para-isomer with the desorbent or, in other words, the relative rate of description of the para-isomer. This characteristic relates directly to the amount of desorbent that must be employed in the process to recover the adsorbed isomer from the adsorbent. The adsorbent produced by the method of this invention not only has good aromatic capacity and good selectivity but has faster transfer rates.

In order to test various adsorbents to measure the characteristics of adsorptive capacity, selectivity and the rate of desorption, a dynamic testing apparatus is employed. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure. Attached to the outlet line of the chamber is chromatographic analysis equipment used to analyze the effluent stream leaving the adsorbent chamber.

A pulse test, performed using this apparatus and the following general procedure, is used to determine selectivities and other data for various adsorbent systems. The adsorbent was filled to equilibrium with a particular desorbent by passing the desorbent through the adsorbent chamber. At a convenient time, a pulse of feed containing known concentrations of non-adsorbed paraffinic tracer (n-nonane) and of aromatic isomers all diluted in desorbent is injected for a duration of several minutes. Desorbent flow is resumed, and the tracer and the aromatic isomers are eluted as in a liquid-solid chromatographic operation. The effluent is analyzed by onstream chromatographic equipment and traces of the envelopes of corresponding component peaks are developed.

From information derived from the chromatographic traces adsorbent performance can be rated in terms of capacity index for the para isomer, selectivity for the para isomer with respect to the other isomers and rate of desorption of the para isomer by the desorbent. The capacity index is characterized by the distance between the center of the para isomer peak envelope and the $C_9$ tracer peak envelope. It is expressed in terms of the volume in cubic centimeters of desorbent pumped during this time interval. Selectivity, (B), for paraisomer with respect to the other isomers (p/m, p/o) is characterized by the ratio of the distance between the center of the para isomer peak envelope and the $C_9$ tracer peak envelope to the corresponding distance for the other isomers. The transfer rates are, we have found, best characterized by the width of the $C_9$ tracer peak envelope at half intensity. The narrower the peak width the faster the desorption rate.

To translate this type of data into a practical aromatic separation process requires actual testing of the best system in a continuous countercurrent liquid-solid contacting device.

The general operating principles of such a device have been previously described and are found in Broughton U.S. Pat. No. 2,985,589 and a specific laboratory-size apparatus utilizing these principles is described in deRosset et al U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on adsorbent testing and evaluation may be found in the paper "Separation of $C_8$ Aromatics by Adsorption" by A. J. deRosset, R. W. Neuzil, A. J. Korous and D. H. Rosback presented at the American Chemical Society, Los Angeles, Calif., March 28–April 2, 1971.

The superior performance of these specially prepared adsorbents which was indicated by the pulse test results was confirmed by continuous testing in this device.

In view of the superior characteristics of the specially prepared adsorbent, the present invention comprehends the improved adsorption processes that are produced by the use of such an adsorbent; specifically, an improved process which uses para isomer from a feed mixture comprising at least two bi-alkyl substituted monocyclic aromatic isomers, including the para-isomer, said isomers having from 8 to about 18 carbon atoms per molecule. More specifically, my invention comprehends an improved process for separating para-xylene from a feed mixture comprising para-xylene and at least one other $C_8$ aromatic isomer.

Feed stocks which can be used in improved adsorption separation processes using the specially prepared adsorbent are characterized by the formula shown in Formula 3 below:

Formula 3

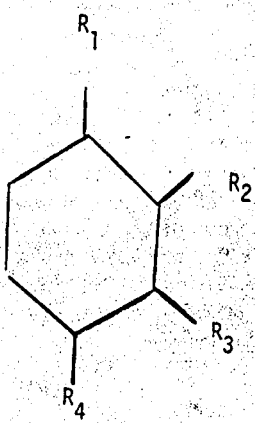

wherein $R_1$, $R_2$, $R_3$ and $R_4$ are selected from the group of alkyl chains in a manner to allow an essentially bi-alkyl substitution at either ortho-, meta- or para-isomer positions. The R substitutional groups can include alkyl groups ranging from methyl substitution groups up to and including chains having 11 or less carbon atoms per molecule. The alkyl side chains can be both normal and branched in nature and are preferably saturated chains.

Specific representative compounds which can be utilized as feedstocks in the process include those feedstocks containing the xylene isomers and ethylbenzene and the various isomers of methylethylbenzene, diethylbenzene, isopropyltoluene, the methylpropylbenzenes, ethylpropylbenzenes, methylbutylbenzenes, ethylbutylbenzene, dipropylbenzenes, methylpentylbenzene, etc., and combinations thereof. The above list only represents a small fraction of compounds whose isomers can be separated by improved adsorptive-separation processes employing the specially prepared adsorbent.

The isomers of such compounds are separated by this adsorbent according to their configuration depending whether they are of a para-, meta- or ortho-isomer construction. Specifically, the para isomer is selectively adsorbed relative to the other isomers. It is contemplated that with feed stocks containing mixtures of more than one class of isomers, for example, $C_8$ isomers in mixture with $C_9$ or $C_{10}$ isomers, molecular weight differences will unduly interfere with selective adsorption based upon isomer configuration differences. It is therefore preferred that the process utilizing the adsorbent produced by the method of this invention to employ feed stocks comprising only a single class of aromatic isomers, that is, aromatic isomers having an equal number of carbon atoms per molecule. It is more preferable to use isomers having as their only differences the location of the alkyl substituted groups in a para-, meta- or ortho-position. The alkyl structures should preferably be the same for each isomer of a class. In some instances an isomer may have alkyl chains which are both normal or branched or one branched and one normal.

The feed stocks may contain small quantities of straight or branched chain paraffins, cyclo-paraffins or olefinic material. It is preferable to have these quantities at a minimum amount in order to prevent contamination of products from this process by materials which are not selectively adsorbed or separated by the adsorbent. Preferably the above-mentioned contaminants should be less than about 20% of the volume feed stock passed into the process.

To separate the para isomer contained in the feed mixture, the feed is contacted with a bed or beds of the specially prepared adsorbent and para isomer is selectively retained by the adsorbent while the unadsorbed or raffinate mixture which comprises the other isomers is removed from the interstitial void spaces between the particles of adsorbent and the surface of the adsorbent. The adsorbent may then be contacted with the desorbent material which is capable of displacing the adsorbed para isomer from the adsorbent. Alternatively, the adsorbed para isomer could be removed from the adsorbent by purging or by increasing the temperature of the adsorbent or by decreasing the pressure of the chamber or vessel containing the adsorbent or by a combination of these means.

The adsorbent can be contained in one or more chambers where through programmed flow into and out of the chambers separation of the para isomer is effected. A particularly preferred process which can be improved by using the specially prepared adsorbent employs the simulated moving-bed countercurrent operations similar to those disclosed in pattern of operations in U.S. Pat. No. 2,985,589 and as more specifically described in U.S. Pat. Nos. 3,558,730; 3,558,732; 3,626,020; 3,663,638; and 3,686,342. The preferred process for separating the para isomer from a feed mixture containing at least two bi-alkyl substituted monocyclic aromatic isomers, including the para-isomer, said isomers having from 8 to about 18 carbon atoms per molecule comprises the steps of: contacting the feed mixture with the specially prepared adsorbent at adsorption conditions to effect the selective adsorption of para-isomer from the adsorbent, withdrawing from the bed of adsorbent a raffinate stream comprising less selectively adsorbed aromatic isomers, contacting the adsorbent with a desorbent material at desorption conditions to effect desorption of para isomer from the adsorbent, and withdrawing a stream containing the para isomer and desorbent from the adsorbent.

Preferred operating conditions for both adsorption and desorption of this particular process include a temperature within the range of from about 70° to about 450°F. and a pressure within the range of from about atmospheric to about 500 psig. Furthermore, both adsorption and desorption of the para isomer are preferably effected at conditions selected to maintain liquid phases throughout the bed of adsorbent.

The adsorbent produced by the method of this invention may, of course, be used in other selective adsorption processes for separating aromatic isomers. These might include, for instance, swing-bed or moving-bed processes. Adsorption and desorption in such processes may both be conducted in vapor phase or liquid phase or one operation may be conducted in the vapor phase and the other in the liquid phase. Operating pressures and temperatures for adsorption and desorption might be the same or different.

The desorbents which can be used in the processes employing this adsorbent will vary depending on the type of operation employed. In the swing-bed system in which the selectively adsorbed para isomer is removed from the adsorbent by a purge stream, gaseous hydrocarbons such as methane, ethane, etc. or other types of gases such as nitrogen or hydrogen may be used at elevated temperatures or reduced pressures or both to effectively purge adsorbed para-xylene from within the adsorbent.

However, in processes which are generally operated at substantially constant pressures and temperatures to insure liquid phase the desorbent relied upon must be judiciously selected in order that it may displace the adsorbed isomer from the adsorbent without unduly preventing the adsorbed isomer from displacing the desorbent in a following adsorption cycle. In such processes it is preferred to use an aromatic-containing desorbent. As disclosed in U.S. Pat. Nos. 3,558,732 and 3,686,342, toluene- and diethylbenzene-containing desorbents are especially preferred for this type of operation.

Desorbents which can be used in the process of this invention should also be materials that are easily separable from the feed mixture that is passed into the process. In desorbing the preferentially adsorbed component of the feed both desorbent and the desorbed feed component are removed from the adsorbent in admixture. Without a method of separation in these two materials, the purity of the selectively adsorbed component of the feed stock would not be very high since it would be diluted with desorbent. It is contemplated that a desorbent having a different boiling range (either higher or lower) than that of the feed mixture used should be used in this process. The use of a desorbent of a different boiling range allows a simple separation by fractionation or other methods to remove desired feed components from the desorbent and allow reuse of the desorbent in the process.

The examples shown below are intended to illustrate the specially prepared adsorbent. Testing of the various adsorbents was done with $C_8$ aromatics for convenience and the examples are not to be construed as unduly limiting the appended claims.

EXAMPLE I

In this example a crystalline aluminosilicate adsorbent was prepared employing a specific method included within the scope of the appended claims.

Nominal 1/16-inch extrudate containing type 13X zeolite was ground to produce 16–40 U.S. Standard Mesh particle size material having chemical and physical properties as shown in Table No. 1 shown below:

Table No. 1

| Properties of the Starting Material | |
|---|---|
| Chemical Properties | |
| Volatile Matter (loss on ignition at 900° C.), wt. % | 3.2 |
| $SiO_2$ (volatile free) wt. % | 50.7 |
| $Al_2O_3$ (volatile free) wt. % | 33.6 |
| $Na_2O$ (volatile free) wt. % | 12.4 |
| $Na_2O/Al_2O_3$ | .61 |
| $SiO_2/Al_2O_3$ | 2.56 |
| Physical Properties | |
| Apparent Bulk Density, gm/cc | 0.635 |
| Surface Area, M²/gm | 500 |
| Pore Volume, ml/gm | 0.30 |
| Pore Diameter, A | 24 |

Table No. 1-Continued

| Properties of the Starting Material | |
|---|---|
| Area % faujasite (X-ray) | 93 |
| $SiO_2/Al_2O_3$ (X-ray) | 2.5 |

One hundred pounds of the granular base material was loaded into an ion exchange tower against an upward flow of 1.6 wt. % NaOH solution at a rate such that the effluent temperature did not exceed 145°F. After all of the material was loaded, the material was ion exchanged by passing the 1.6 wt. % NaOH solution upflow through the ion exchange tower at a liquid hourly space velocity of 1.5 and a temperature of 200°F. until a total of 0.335 pounds of NaOH per pound of volatile-free starting material had been passed through the tower. After this first ion exchange the material was water-washed to remove excess NaOH solution by passing treated water, having a pH of 9, upflow through the tower at 1.5 LHSV and 140°F. to a total of 1.3 gallons of water per pound of volatile free starting material. Test samples of particles removed after this wash had the properties as shown in Table No. 2.

Table No. 2

| Properties of the Sodium-exchanged Material | |
|---|---|
| Chemical Properties | |
| Volatile Matter (loss on ignition at 900° C.), wt. % | 25.4 |
| $SiO_2$ (volatile free) wt. % | 48.0 |
| $Al_2O_3$ (volatile free) wt. % | 32.1 |
| $Na_2O$ (volatile free) wt. % | 15.8 |
| $Na_2O/Al_2O_3$ | 0.81 |
| $SiO_2/Al_2O_3$ | 2.54 |
| Physical Properties | |
| Apparent Bulk Density, gm/cc | 0.671 |
| Surface Area, M²/gm | 516 |
| Pore Volume, ml/gm | 0.27 |
| Pore Diameter, A | 21 |
| Area % faujasite (X-ray) | 110 |
| $SiO_2/Al_2O_3$ (X-ray) | 2.5 |

The second ion-exchange conditions were then effected to produce a barium-potassium exchanged type X structured zeolite by the two-step procedure previously described. A potassium chloride solution was first passed over the particles at 180° F. and at one liquid hourly space velocity until a total of about 12 pounds of a 6.9 wt. % potassium chloride solution had contacted one pound of the particle. After the ion-exchange solution had been expended the particles were essentially totally potassium exchanged and were thereafter water washed at a three liquid hourly space velocity in the manner previously described until the effluent water removed from the particles was essentially chloride-free. After the water-washing step had been completed the particles were then ion exchanged with a 2.4 wt. % barium chloride solution at 180°F. The second step of the ion-exchange conditions were continued until test samples of particles removed during this step indicated that the approximate ratio of the weight of barium over potassium present within the zeolite was within the range of from about 1.5 to about 200. After the barium exchange the particles were again water washed at approximately 9 pH until the effluent water was essentially chloride free.

The washed material was then dewatered, unloaded from the ion exchange tower, and dried in a forced air oven at 570°F. to a volatile content of about 2.0 wt. %. Properties of the finished adsorbent are shown in Table No. 3 below.

Table No. 3

Properties of the Finished Adsorbent

Chemical Properties

| | |
|---|---|
| Volatile Matter (LOI at 900°C), wt. % | 2.2 |
| $SiO_2$ (volatile-free) wt. % | 42.1 |
| $Al_2O_3$ (volatile-free) wt. % | 28.3 |
| $Na_2O$ (volatile-free) wt. % | 2.0 |
| $K_2O$ (volatile-free) wt. % | 6.1 |
| BaO (volatile-free) wt. % | 20.3 |
| $SiO_2/Al_2O_3$ | 2.52 |

EXAMPLE II

In this example, five adsorbents were tested in a dynamic testing apparatus to illustrate desired properties achieved by the method of this invention. Adsorbent A was a sample of the adsorbent prepared in Example I above; adsorbents B and C were adsorbents prepared similar to the procedure set forth in Example I above but with different Ba/K weight ratios than that of adsorbent A; adsorbents D and E were adsorbents prepared from the same base material of Example I but without the sodium ion exchange step that was used in the preparation of adsorbents A, B, and C.

The dynamic testing apparatus and the pulse test have been previously described. The pulse test is a testing method by which certain adsorbent characteristics can be obtained.

The five adsorbents were tested using this test method to determine the selectivity of the adsorbent particles for para-xylene relative to the other $C_8$ aromatic isomers and to determine the rate of desorption of para-xylene by a particular desorbent. The feed mixture used contained 5 vol. % para-xylene, 5 vol. % meta-xylene, 5 vol. % ortho-xylene, 5 vol. % ethylbenzene, 5 vol. % of normal $C_9$ paraffin which was used as a tracer and 75 vol. % of an inert hydrocarbon material. The desorbent employed was toluene. All of the adsorbents were dried in situ to less than about 3 wt. % volatile matter as measured at 900°C.

The dynamic testing apparatus was maintained at a controlled temperature of 150°C. with sufficient pressure on the entire testing unit to maintain essentially liquid phase operations. By alternate passage of feed stock and desorbent into the testing unit and constant monitoring of the effluent from the chamber with chromatographic equipment, traces of the envelopes of component peaks were developed. From these traces data can be obtained, in the manner previously described, which will characterize various adsorbent properties.

The results of the adsorptive testing for the five adsorbents are shown in Table No. 4 below.

As can be seen from the above data in Table No. 4, all five adsorbents tested were preferentially selective for adsorbing para-xylene with respect to the other $C_8$ aromatics. As can be seen, however, the adsorbents A, B, and C prepared by the method of this invention exhibit increased para-xylene selectivity with respect to all of the other $C_8$ aromatic isomers as the weight ratio of Ba/K increases. With adsorbents D and E, which were not prepared by this method, para-xylene ethylbenzene selectivity increases with increasing Ba/K but para/meta and para/ortho selectivities do not. For this reason the presence of an addition cation such as potassium had therefore been found essential prior to the method of this invention to provide suitable para/meta and para/ortho selectivity to complement the para/ethylbenzene provided by the presence of the barium cation. By the method of our invention a barium-containing adsorbent having suitable para-xylene selectivities with respect to all other $C_8$ aromatic isomers can be produced without the requirement of an additional cation.

Table No. 4 also shows that the adsorbents produced by the method of this invention have faster rates of para-xylene adsorption-desorption. These relative rates can be characterized by the width of the normal $C_9$ tracer at half intensity; the narrower the peak width, the faster adsorption-desorption rates. As shown, the tracer peak widths for adsorbents A, B and C which were prepared by the method of this invention are narrower than those for adsorbents D and E and therefore possess the faster adsorption-desorption rates.

I claim as my invention:
1. A process for separating the paraisomer from a feed mixture comprising at least two bi-alkyl substituted mono-cyclic aromatic isomers, including the para-isomer, said isomers having from 8 to about 18 carbon atoms per molecule, which process comprises contacting said mixture with an adsorbent prepared by the steps of:
   a. contacting a base material comprising X or Y zeolite with an aqueous sodium hydroxide solution at first ion exchange conditions to effect the addition of sodium cations to said base material;
   b. treating the sodium-exchanged base material at second ion exchange conditions to effect the essentially complete exchange of sodium cations with barium or barium and potassium cations; and,
   c. drying the material at conditions to reduce the LOI at 900°C. to less than about 10 wt. % and thereby selectively adsorbing at adsorption conditions said para-isomer.

2. The process of claim 1 further characterized in that said para-isomer is para-xylene and said feed mixture comprises paraxylene and at least one other $C_8$ aromatic isomer.

Table No. 4

Testing Results

| Adsorbent Designation | Sodium Ion Exchange | Wt. % BaO | Wt. % $K_2O$ | Wt. Ratio Ba/K | Selectivities | | | Peak Width in cc |
|---|---|---|---|---|---|---|---|---|
| | | | | | P/EB | P/M | P/O | |
| A | YES | 20.3 | 6.1 | 3.6 | 2.23 | 2.70 | 2.13 | 9.7 |
| B | YES | 24.1 | 5.2 | 5.0 | 2.51 | 2.90 | 2.24 | 8.7 |
| C | YES | 30.1 | 0.6 | 54.1 | 2.78 | 3.12 | 2.34 | 9.4 |
| D | NO | 22.0 | 5.9 | 4.0 | 2.20 | 2.89 | 2.34 | 12.2 |
| E | NO | 25.7 | 2.7 | 10.3 | 2.55 | 2.65 | 2.09 | 10.9 |

3. The process of claim 1 further characterized in that said adsorption conditions are selected from a temperature within the range of from about 70° to about 450°F. and a pressure within the range of from about atmospheric to about 500 psig. to maintain liquid phase.

4. The process of claim 1 further characterized in that said base material has a $Na_2O/Al_2O_3$ ratio of less than about 0.7.

5. The process of claim 1 further characterized in that said first ion exchange conditions include a temperature within the range of from about 50° to about 250°F. and a sodium hydroxide solution concentration of from about 0.5 to about 10 wt. %.

6. The process of claim 1 further characterized in that said sodium-exchanged base material has a $Na_2O/Al_2O_3$ ratio greater than 0.7.

7. The process of claim 1 further characterized in that said second ion exchange conditions include a pH sufficient to preclude formation of the hydrogen form of the zeolite, and a temperature within the range of from about 50° to about 250° F.

8. The process of claim 1 further characterized in that sodium cations in the sodium-exchanged base material are essentially completely exchanged with both barium and potassium cations.

9. The process of claim 8 further characterized in that the weight ratio of barium over potassium cations if from about 1.5 to 200.

10. The process of claim 1 further characterized in that sodium cations in the sodium-exchanged base material are essentially completely exchanged with barium cations.

11. A process for separating para-xylene from a feed mixture comprising para-xylene and at least one other $C_8$ aromatic isomer which process comprises the steps of:
  a. contacting at adsorption conditions said mixture with an adsorbent prepared by the steps hereinafter enumerated to effect the selective adsorption of para-xylene;
  b. withdrawing from the adsorbent a stream comprising less selectively adsorbed aromatic isomers;
  c. contacting the adsorbent with a desorbent material at desorption conditions to effect desorption of para-xylene from the adsorbent; and,
  d. withdrawing from the adsorbent a stream containing para-xylene and desorbent; wherein the adsorbent is prepared by the steps of:
    i. contacting a starting material comprising X or Y structured zeolite having a $Na_2O/Al_2O_3$ ratio less than about 0.7 with an aqueous sodium hydroxide solution at first ion exchange conditions, including a temperature within the range of from about 50° to 250°F. and a sodium hydroxide solution concentration of from about 0.5 to about 10 wt. % to increase the sodium cation content to a $Na_2O/Al_2O_3$ ratio of greater than about 0.7;
    ii. treating the sodium-exchanged base material at second ion exchange conditions, including a pH sufficient to preclude the formation of the hydrogen form of the zeolite and a temperature within the range of from about 50° to about 250°F., to effect the essentially complete exchange of sodium cations with barium or barium and potassium cations; and,
    iii. drying the resulting material at conditions sufficient to reduce the LOI at 900°C. to less than about 10 wt. %.

12. The process of claim 11 further characterized in that said adsorption and desorption conditions are selected from a temperature within the range of from about 70° to about 450° F. and a pressure within the range of from about atmospheric to about 500 psig. to maintain a liquid phase.

13. The process of claim 11 further characterized in that said desorbent material comprises toluene.

14. The process of claim 11 further characterized in that said desorbent comprises diethylbenzene.

15. The process of claim 11 further characterized in that the sodium cations in the sodium-exchanged base material are essentially completely exchanged with both barium and potassium cations.

16. The process of claim 11 further characterized in that the sodium cations in the sodium-exchanged base material are essentially completely exchanged with barium cations.

* * * * *